United States Patent
Bunker

(10) Patent No.: US 10,605,170 B2
(45) Date of Patent: Mar. 31, 2020

(54) ENGINE COMPONENT WITH FILM COOLING

(71) Applicant: General Electric Company, Schenectady, NY (US)

(72) Inventor: Ronald Scott Bunker, West Chester, OH (US)

(73) Assignee: General Electric Company, Schenectady, NY (US)

(\*) Notice: Subject to any disclaimer, the term of this patent is extended or adjusted under 35 U.S.C. 154(b) by 678 days.

(21) Appl. No.: 14/950,677

(22) Filed: Nov. 24, 2015

(65) Prior Publication Data

US 2017/0145921 A1    May 25, 2017

(51) Int. Cl.
     *F01D 25/12*      (2006.01)
     *F01D 5/18*      (2006.01)
     (Continued)

(52) U.S. Cl.
     CPC .............. *F02C 7/141* (2013.01); *F01D 5/186* (2013.01); *F01D 25/12* (2013.01); *F23R 3/005* (2013.01);
     (Continued)

(58) Field of Classification Search
     CPC .... F02C 7/12; F02C 7/18; F01D 5/186; F01D 5/187; F01D 25/12; F05D 2240/127; F05D 2250/712; F05D 2260/202; F05D 2260/2212; F23R 3/002; F23R 2900/03041; F23R 2900/03042; F23R 2900/03043; F23R 2900/03045
     See application file for complete search history.

(56) References Cited

U.S. PATENT DOCUMENTS 5,329,773 A \* 7/1994 Myers ..................... F23R 3/002
     60/757
6,237,344 B1 \* 5/2001 Lee ......................... F01D 5/186
     165/908
(Continued)

FOREIGN PATENT DOCUMENTS

| CN | 1932263 A | 3/2007 |
| CN | 1982654 A | 6/2007 |
| WO | 95/25932 A1 | 9/1995 |

OTHER PUBLICATIONS

Extended European Search Report and Opinion issued in connection with corresponding EP Application No. 16200010.3 dated Apr. 4, 2017.
(Continued)

*Primary Examiner* — Ehud Gartenberg
*Assistant Examiner* — James P McGlynn
(74) *Attorney, Agent, or Firm* — McGarry Bair PC

(57) ABSTRACT

An engine component for a gas turbine engine which generates a hot combustion gas flow adjacent a hot surface and provides a cooling fluid flow adjacent a cooling surface comprises a wall separating the hot combustion gas flow and the cooling fluid flow. At least one concavity is provided in the cooling surface and at least one film hole is provided in the cooling surface providing the cooling fluid flow to the hot surface. An inlet for the film hole is spaced from the at least one concavity, located upstream of the at least one concavity and in alignment with the at least one concavity relative to the cooling fluid flow.

14 Claims, 8 Drawing Sheets

(51) Int. Cl.
*F02C 7/141* (2006.01)
*F23R 3/00* (2006.01)
*F02C 7/18* (2006.01)

(52) U.S. Cl.
CPC .......... *F02C 7/18* (2013.01); *F05D 2240/127* (2013.01); *F05D 2260/202* (2013.01); *F05D 2260/2212* (2013.01); *F23R 2900/03042* (2013.01); *Y02T 50/672* (2013.01); *Y02T 50/676* (2013.01)

(56) References Cited

U.S. PATENT DOCUMENTS

| | | | | |
|---|---|---|---|---|
| 6,270,317 | B1* | 8/2001 | Manning | F01D 5/186 416/97 R |
| 7,121,787 | B2* | 10/2006 | Jacks | F01D 5/186 415/115 |
| 7,182,576 | B2 | 2/2007 | Bunker et al. | |
| 7,244,101 | B2 | 7/2007 | Lee et al. | |
| 7,513,737 | B2* | 4/2009 | Daux | F01D 5/187 415/115 |
| 2005/0163609 | A1 | 7/2005 | Riahi et al. | |
| 2006/0073015 | A1 | 4/2006 | Liang | |
| 2007/0048133 | A1 | 3/2007 | Palmer et al. | |
| 2011/0027102 | A1* | 2/2011 | Nakamata | F01D 5/186 416/97 R |
| 2016/0116166 | A1* | 4/2016 | Drake | F23R 3/005 60/752 |
| 2016/0123592 | A1* | 5/2016 | Drake | F23R 3/005 60/752 |
| 2017/0145831 | A1 | 5/2017 | Bunker | |
| 2017/0159449 | A1 | 6/2017 | Buhler et al. | |
| 2017/0159450 | A1 | 6/2017 | Buhler et al. | |
| 2017/0159452 | A1 | 6/2017 | Bunker et al. | |
| 2017/0167268 | A1 | 6/2017 | Bunker | |

OTHER PUBLICATIONS

Machine Translation and First Office Action and Search issued in connection with corresponding CN Application No. 201611043589.9 dated Dec. 29, 2017.

* cited by examiner

ENGINE COMPONENT WITH FILM COOLING

BACKGROUND OF THE INVENTION

Turbine engines, and particularly gas or combustion turbine engines, are rotary engines that extract energy from a flow of combusted gases passing through the engine in a series of compressor stages, which include pairs of rotating blades and stationary vanes, through a combustor, and then onto a multitude of turbine blades. Gas turbine engines have been used for land and nautical locomotion and power generation, but are most commonly used for aeronautical applications such as for airplanes, including helicopters. In airplanes, gas turbine engines are used for propulsion of the aircraft.

Gas turbine engines for aircraft are designed to operate at high temperatures to maximize engine efficiency, so cooling of certain engine components, such as the high pressure turbine and the low pressure turbine, can be necessary. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is a high temperature, it is cooler relative to the turbine air, and can be used to cool the turbine.

Concavities on a surface adjacent to the cooling flow have been used as a thermal cooling feature, however the concavities tend to generate an unsteady or vortical airflow as the cooling flow passes through or over them, which can disrupt additional cooling feature dependent on the cooling fluid flow.

BRIEF DESCRIPTION OF THE INVENTION

In one aspect, an engine component for a gas turbine engine, which generates a hot combustion gas flow, and provides a cooling fluid flow, comprises a wall separating the hot combustion gas flow from the cooling fluid flow and having a hot surface along with the hot combustion gas flow in a hot flow path and a cooling surface facing the cooling fluid flow. The engine component further comprises at least one concavity provided in the cooling surface and at least one film hole having an inlet provided on the cooling surface, an outlet provided on the hot surface, and a passage connecting the inlet and the outlet. The inlet is spaced from the at least one concavity, located upstream of the at least one concavity, and in cooling fluid flow alignment with the at least one concavity.

In another aspect, an engine component for a gas turbine engine, which generates a hot combustion gas flow, and provides a cooling fluid flow, comprising a wall separating the hot combustion gas flow from the cooling fluid flow and having a hot surface with the hot combustion gas flow in a hot flow path and a cooling surface facing the cooling air flow. The engine component further comprises multiple concavities provided in the cooling surface and multiple film holes having an inlet provided on the cooling surface, an outlet provided on the hot surface, and a passage connecting the inlet and the outlet. At least a subset of the concavities and inlets are paired, with the inlet for the pair being spaced from and located upstream of the at least one concavity and in cooling fluid flow alignment with the at least one concavity.

In yet another aspect, a method of cooling an engine component having a cooling surface along which a cooling fluid flows comprising providing a cooling fluid flow through a film hole inlet on the cooling surface immediately upstream of a concavity on the cooling surface.

In yet another aspect, an engine component for a gas turbine engine, which generates a hot combustion gas flow, and provides a cooling fluid flow comprising a wall separating the hot combustion gas flow from the cooling fluid flow and having a hot surface adjacent the hot combustion gas flow and a cooling surface adjacent the cooling fluid flow. The engine component further comprises at least one concavity provided in the cooling surface and at least one film hole having an inlet provided on the cooling surface, an outlet provided on the hot surface, and a passage connecting the inlet and the outlet with the inlet space from the at least on concavity. The inlet is spaced from the at least one concavity by at least one of upstream, downstream, lateral to the concavity, or a combination thereof.

DESCRIPTION OF EMBODIMENTS OF THE INVENTION

Figure 1:
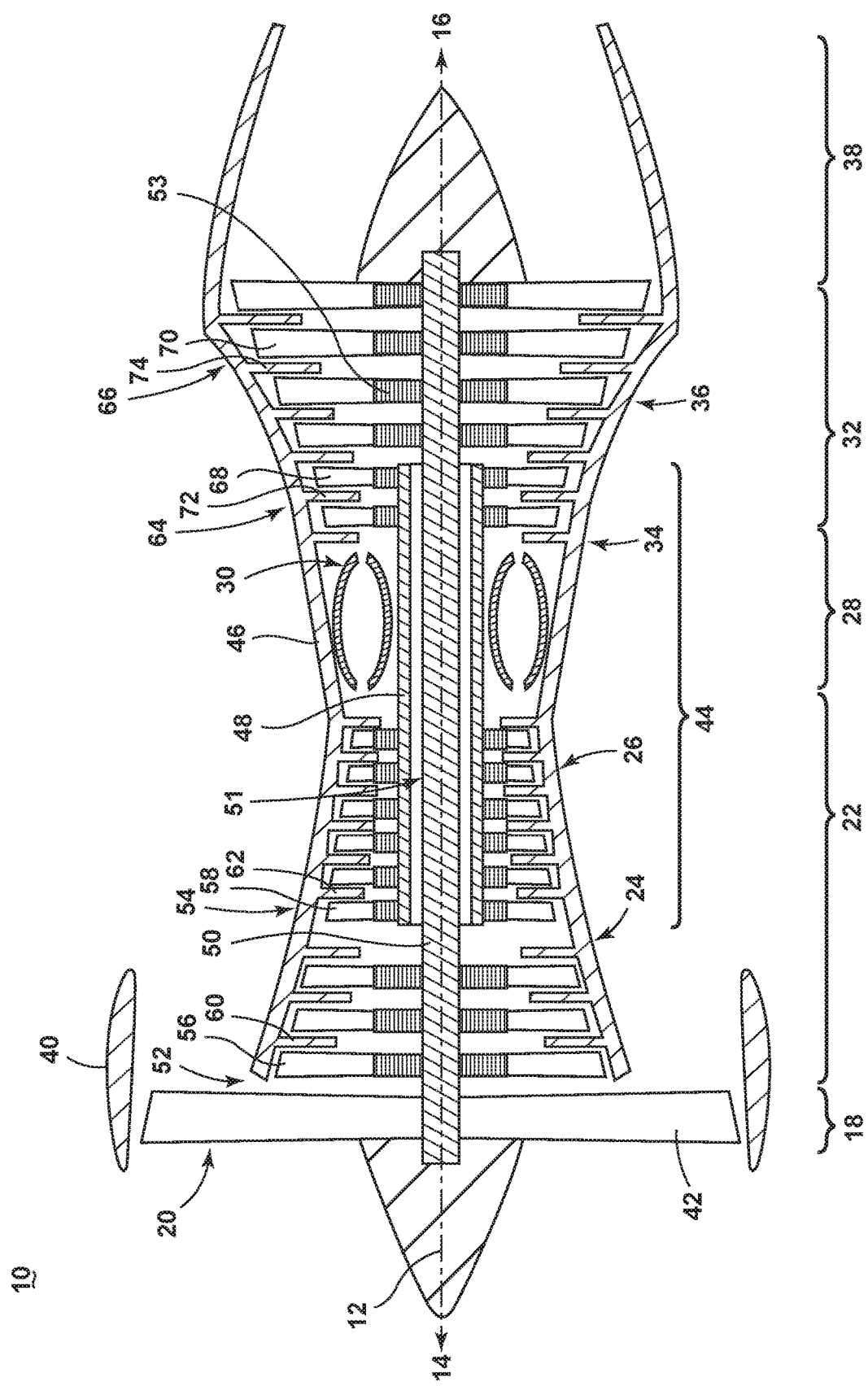
FIG. 1 is a schematic, sectional view of a gas turbine engine.

The described embodiments of the present invention are directed to apparatuses, methods, and other devices related to routing airflow in a turbine engine. For purposes of illustration, the present invention will be described with respect to an aircraft gas turbine engine. It will be understood, however, that the invention is not so limited and can have general applicability in non-aircraft applications, such as other mobile applications and non-mobile industrial, commercial, and residential applications.

It should be further understood that for purposes of illustration, the present invention will be described with respect to an airfoil for a turbine blade of the turbine engine. It will be understood, however, that the invention is not limited to the turbine blade, and can comprise any airfoil structure, such as a compressor blade, a turbine or compressor vane, a fan blade, a strut, a shroud assembly including a shroud and hanger, or a combustor liner or any other engine component requiring cooling in non-limiting examples.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine relative to the engine centerline.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The portions of the engine 10 mounted to and rotating with either or both of the spools 48, 50 are referred to individually or collectively as a rotor 51.

The LP compressor 24 and the HP compressor 26 respectively include a plurality of compressor stages 52, 54, in which a set of compressor blades 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible. The blades 56, 58 for a stage of the compressor can be mounted to a disk 53, which is mounted to the corresponding one of the HP and LP spools 48, 50, with each stage having its own disk. The vanes 60, 62 are mounted to the core casing 46 in a circumferential arrangement about the rotor 51.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but is not limited to, fluid discharged from the LP compressor 24 or the HP compressor 26.

Figure 2:
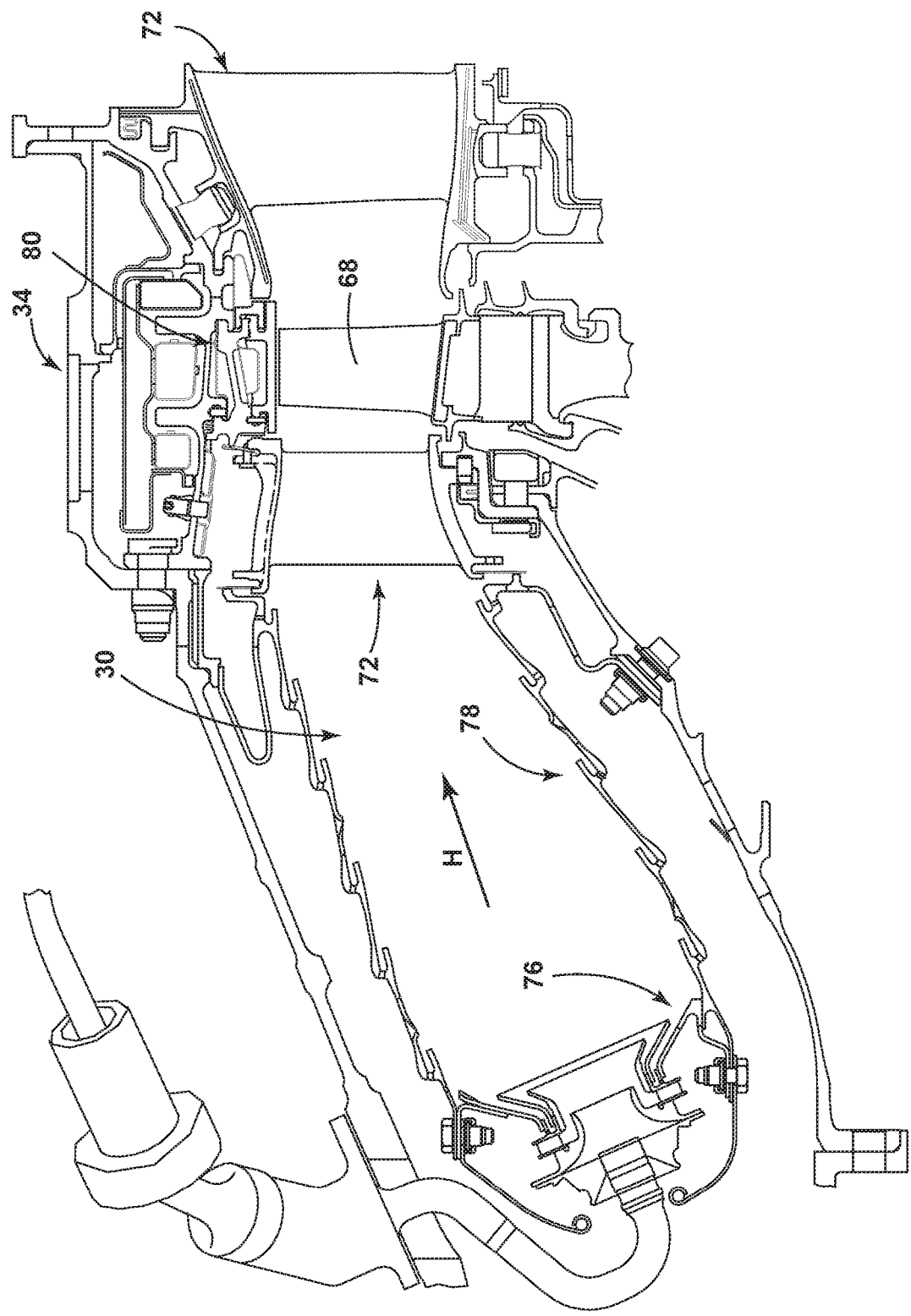
FIG. 2 is side section view of a combustor of the gas turbine engine of FIG. 1.

FIG. 2 is a side section view of the combustor 30 and HP turbine 34 of the engine 10 from FIG. 1. The combustor 30 includes a deflector 76 and a combustor liner 78. Adjacent to the turbine blade 68 of the turbine 34 in the axial direction are sets of static turbine vanes 72 forming nozzles. The nozzles turn combustion gas so that the maximum energy can be extracted by the turbine 34. A shroud assembly 80 is adjacent to the rotating blade 68 to minimize flow loss in the turbine 34. Similar shroud assemblies can also be associated with the LP turbine 36, the LP compressor 24, or the HP compressor 26.

One or more of the engine components of the engine 10 has a film-cooled wall in which various film hole embodiments disclosed further herein can be utilized. Some non-limiting examples of the engine component having a film-cooled wall can include the blades 68, 70, vanes or nozzles 72, 74, combustor deflector 76, combustor liner 78, or shroud assembly 80, described in FIGS. 1-2. Other non-limiting examples where film cooling is used include turbine transition ducts, struts, and exhaust nozzles.

Figure 3:
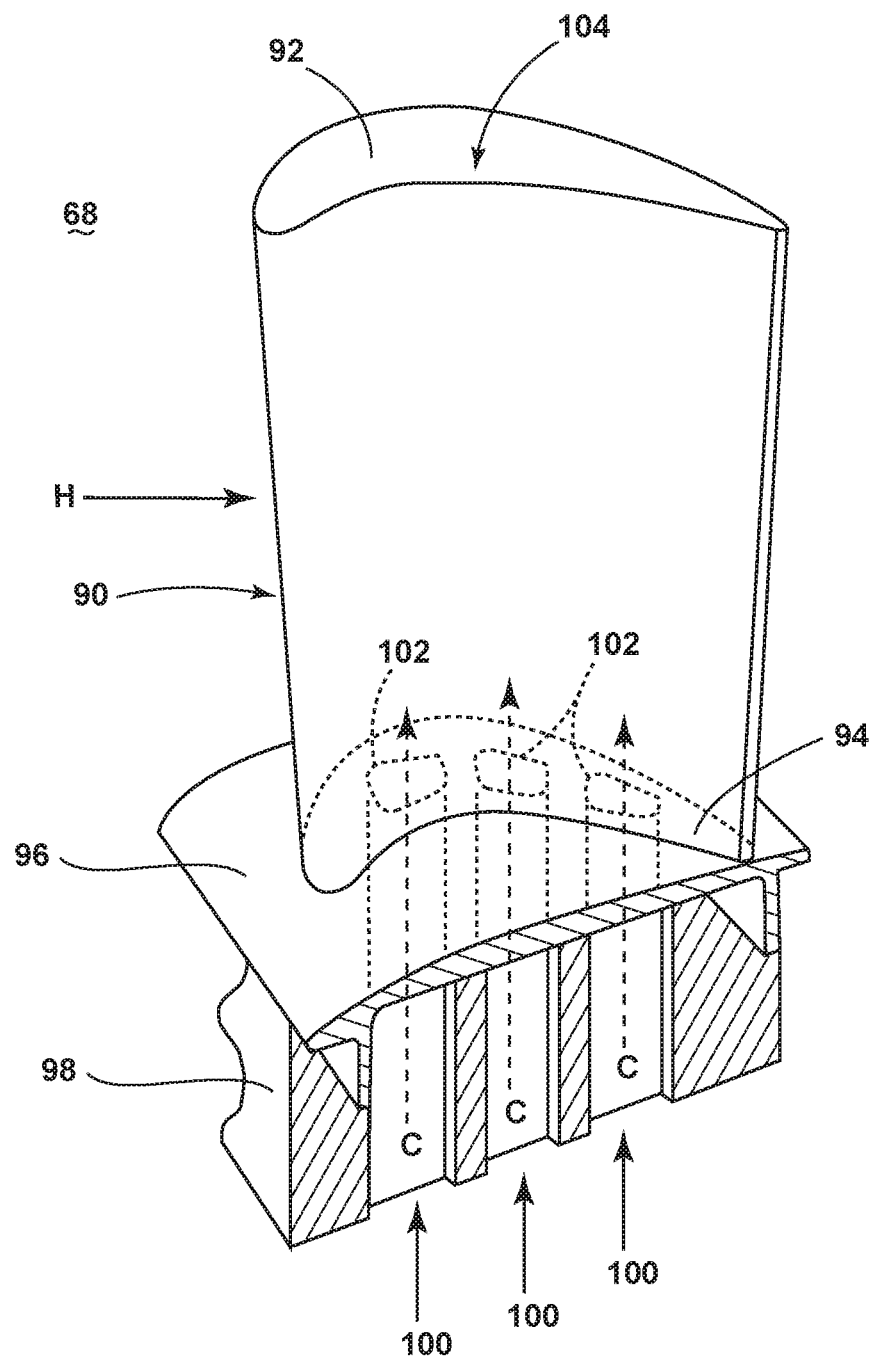
FIG. 3 is a perspective view of an engine component in the form of a turbine blade of the engine of FIG. 2 with cooling air inlet passages.

FIG. 3 is a perspective view of an engine component in the form of one of the turbine blades 68 of the engine 10 of FIG. 1. It should be understood that the blade as described herein is exemplary, and the concepts disclosed extend to additional engine components and are not limited to a blade 68. The turbine blade 68 includes a dovetail 98 and an airfoil 90. The airfoil 90 extends from a tip 92 to a root 94 defining a span-wise direction. The dovetail 98 further includes a platform 96 integral with the airfoil 90 at the root 94, which helps to radially contain the turbine airflow. The dovetail 98 can be configured to mount to a turbine rotor disk on the engine 10. The dovetail 98 comprises at least one inlet passage, exemplarily shown as three inlet passages 100, each extending through the dovetail 98 to provide internal fluid communication with the airfoil 90 at one or more passage outlets 102. It should be appreciated that the dovetail 98 is shown in cross-section, such that the inlet passages 100 are housed within the body of the dovetail 98.

The airfoil 90 can further define an interior 104, such that a flow of cooling fluid C can be provided through the inlet passages 100 and to the interior 104 of the airfoil 90. Thus, the flow of cooling fluid flow C can be fed through the inlet passages 100, exiting the outlets 102, and passing within the interior 104 of the airfoil. The flow of hot combustion gas H can pass external of the airfoil 90, while the cooling fluid flow C moves within the interior 104.

Figure 4:
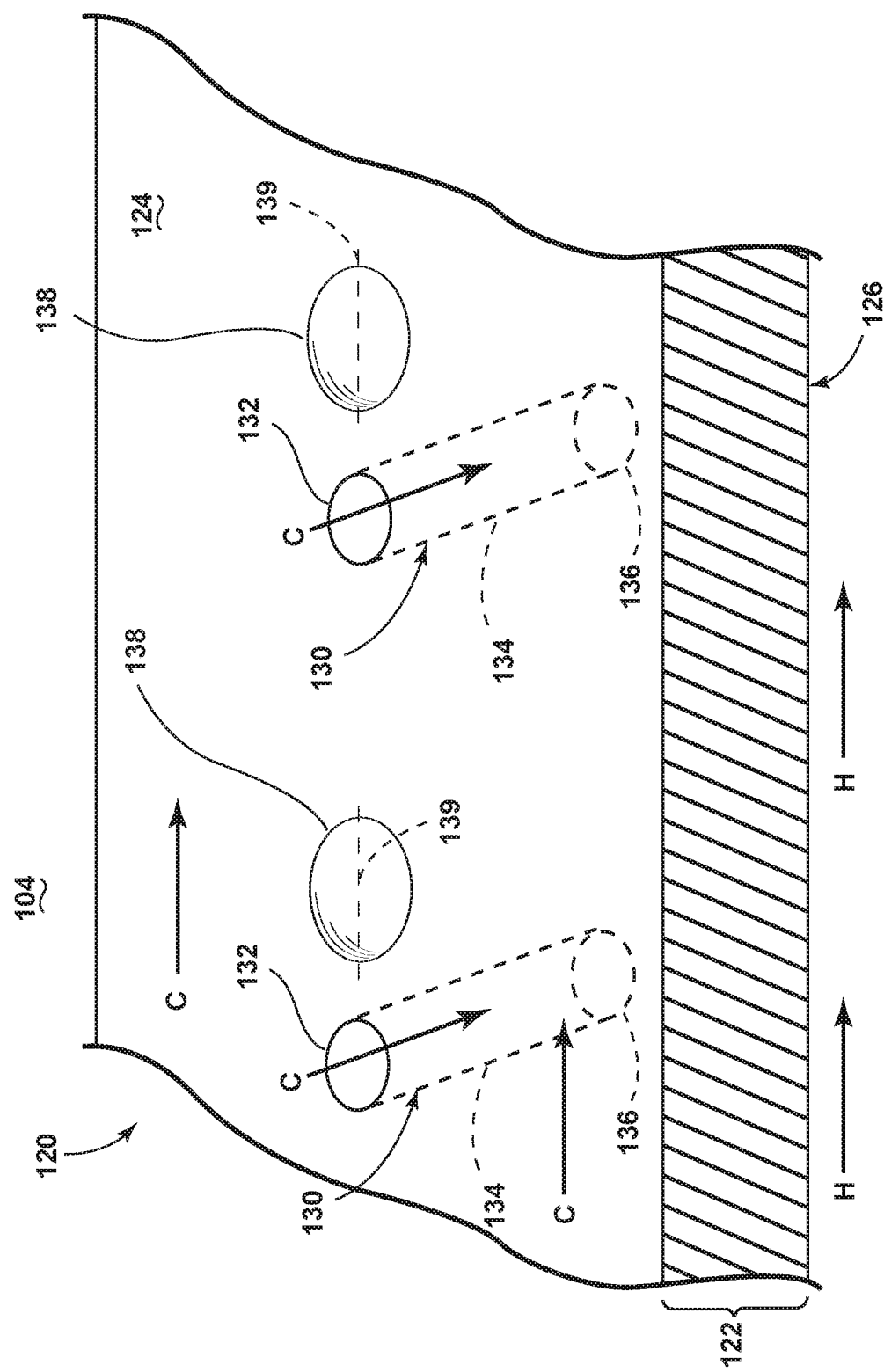
FIG. 4 is a perspective view of a portion of the engine component of FIG. 3 having a plurality of concavities and film holes.

FIG. 4 is a schematic view showing an engine component 120 of the engine 10 from FIG. 1, which can comprise the airfoil 90 of FIG. 3. The engine component 120 can be disposed in the flow of hot combustion gases H. The cooling fluid flow C can be supplied to cool the engine component 120. As discussed above with respect to FIGS. 1-2, in the context of a turbine engine, the cooling fluid flow C can be any cooling fluid, but is most commonly at least one of ambient air supplied by the fan 20 which bypasses the engine core 44, fluid discharged from the LP compressor 24, or fluid discharged from the HP compressor 26.

The engine component 120 includes a wall 122 having a hot surface 126 facing the hot combustion gas H and a cooling surface 124 facing the cooling fluid flow C. In the case of a gas turbine engine, the hot surface 126 can be exposed to gases having temperatures in the range of 1000° C. to 2000° C. Suitable materials for the wall 122 include, but are not limited to, steel, refractory metals such as titanium, or super alloys based on nickel, cobalt, or iron, and ceramic matrix composites.

The engine component 120 can define the interior 104 of the airfoil 90 of FIG. 3, comprising the cooling surface 124. The hot surface 126 can be an exterior surface of the engine component 120, such as a pressure or suction side of the airfoil 90.

The engine component 120 further includes multiple film holes 130 that provide fluid communication between the interior cavity 104 and the hot surface 126 of the engine component 120. During operation, the cooling fluid flow C is supplied to the interior cavity 104 and out of the film holes 130 to create a thin layer or film of cool air on the hot surface 126, protecting it from the hot combustion gas H.

Each film hole 130 can have an inlet 132 provided on the cooling surface 124 of the wall 122, an outlet 134 provided on the hot surface 126, and a passage 136 connecting the inlet 132 and outlet 134. During operation, the cooling fluid flow C enters the film hole 130 through the inlet 132 and passes through the passage 136 before exiting the film hole 130 at the outlet 134 along the hot surface 126.

The passage 136 can define a metering section for metering of the mass flow rate of the cooling fluid flow C. The metering section can be a portion of the passage 136 with the smallest cross-sectional area, and can be a discrete location or an elongated section of the passage 136. The passage 136 can further define a diffusing section in which the cooling fluid flow C can expand to form a wider cooling film. The metering section can be provided at or near the inlet 132, while the diffusion section can be defined at or near the outlet 134.

A plurality of flow control structures, illustrated as concavities 138 can be disposed in the cooling surface 124. The concavity includes a centerline 139 and the cooling fluid flow C flows along the centerline 139. The concavity is a hemi-spherical or hemi-ellipsoidal recess in the cooling surface 124, but can also comprise any recess, such as having rounded or beveled edges with a flat bottom in one non-limiting example. The cooling fluid flow C passing over or along the concavities 138 tends to be unsteady or oscillating, such as a vortical flow, and can be used for thermal enhancement of the wall 122. The concavities 138 and the adjacent film holes 130 can be paired, such that a pair can comprise one film hole 130 and one concavity 138.

It should be understood that the round shape for the film holes 130 and the ellipse-shaped inlets 132, outlets 134, and the concavities 138 are exemplary. Alternative film hole shapes as well as inlet, and outlet shapes are contemplated, including but not limited to circle, oval, triangle, square quadrilateral, unique, or otherwise or a portion thereof.

Figure 5:
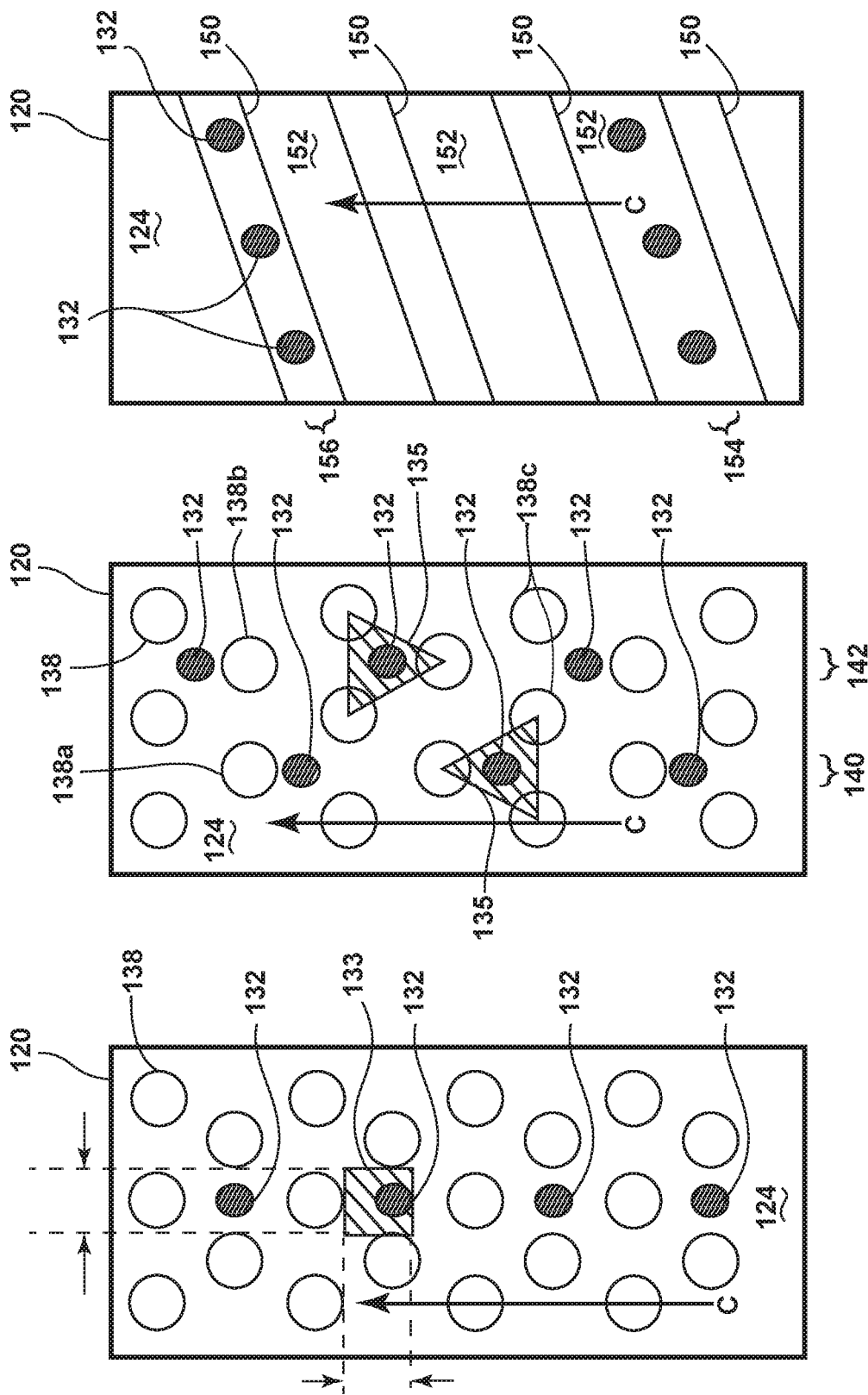
FIG. 5A is a top view of the engine component having aligned film holes and concavities.
FIG. 5B is a top view of the engine component having two sets of aligned film holes and concavities.
FIG. 5C is a perspective view of the engine component having turbulators and film holes.

Turning now to FIGS. 5A-5C, three top views of a portion of the engine component 120 illustrate three separate exemplary implementations of the concavities 138 and the film hole inlets 132. In FIG. 5A, the film hole inlets 132 are spaced from the concavities 138 and are disposed upstream of a concavity 138 relative to the cooling fluid flow C. The inlets 132 are aligned with the concavities 138 relative to the cooling fluid flow C, such that an axis defined through the center of the inlets 132 would be disposed parallel to the cooling fluid flow C. An area 133 can define a space upstream of the concavity 138 where a film hole inlet 132 can be positioned. The area 133 is generally defined by the width of the concavity 138 disposed downstream of the inlet 132 and the distance half-way between the next, upstream concavity 138. The film hole inlet 132 can be positioned anywhere within the area 133. It should be understood that the area 133 as shown is exemplary, and can be greater than the width defined between the concavities 138, such as the lateral spacing between the concavities 138 or the center point between laterally adjacent concavities 138. Thus, it should be appreciated that the area 133 can be variable, being greater or smaller based upon the concavities 138 or alternatively defined such that an area is defined upstream of one concavity 138.

In FIG. 5B, two sets 140, 142 of film hole inlets 132 are shown, each set 140, 142 being defined by an alignment with the cooling fluid flow C. The first set 140 is disposed upstream from the concavity and aligned with the cooling fluid flow C. The inlets 132 of the first set 140 are disposed immediately upstream of the concavities 138a. Immediately upstream of the concavity 138a can be defined as adjacent to the concavity 138 or minimally spaced from the concavity 138a such that the length between the concavity 138 and the inlet 132 is less than the cross-sectional width of the inlet 132. Alternatively, the inlets 132 can be offset from the concavities 138, where axes defined through the center inlets and the center of the concavities are spaced from and parallel to one another, being aligned with the flow of cooling fluid C. A second area 135 can be defined between adjacent concavities 138, such that the inlet 132 can be positioned upstream, downstream, lateral to, or a combination thereof the concavities 138 defining the second area 135. Two separate orientations of the second area 135 are illustrated, and can be defined between any three adjacent concavities 138. The film hole inlet 132 can be placed anywhere within the second area 135. Similar to the area 133 of FIG. 5A, the second area 135 should not be construed as limiting, and can be greater or smaller than what is illustrated, being disposed upstream of at least one concavity 138.

Looking at the second set 142, the inlets 132 can be disposed downstream of the concavity 138b. Additionally, the inlets 132 can be disposed laterally from the concavities 138c disposed on the sides of the inlets 132, such that the inlet 132 can be positioned laterally relative to the concavities 138c. It should be appreciated that the inlets 132 can be spaced upstream, downstream, lateral to, or any combination thereof relative to the position of a nearby concavity, with reference to the direction of the flow of the cooling fluid C.

Turning to FIG. 5C, the engine component 120 can comprise a plurality of inverted turbulators 150 disposed along the cooling surface 124. The inverted turbulators 150, similar to the concavities 138, can be disposed on the cooling surface 124 of the engine component 120 and can create an unsteady or oscillating flow, such as a vortical flow, and can be used for thermal enhancement of the engine component 120. The inverted turbulators 150 can define a plurality of intervening spaces 152 between adjacent inverted turbulators 150, which can comprise the concavity disposed in the cooling surface 124. The inlets 132, shown as a third set 154 and a fourth set 156, can be disposed in the intervening spaces 152 between the inverted turbulators 150, or can be disposed in the inverted turbulators 150, having the third set 154 shown in the intervening space 152 and the fourth set 156 shown on the inverted turbulator 150. The third set 154 can be disposed upstream or immediately upstream of the inverted turbulator 150 to provide the flow of cooling fluid C to the inlet 132 prior to turbulation of the cooling fluid flow C by the inverted turbulator 150. The fourth set 156 is positioned in the inverted turbulator 150, feeding the inlets 132 with the cooling fluid flow C upstream of the unsteady flow downstream of the inverted turbulator 150.

It should be understood that an inverted turbulator 150 is a turbulator recessed in or disposed in the cooling surface 124, such that a concavity can be defined by the recessed disposition of the inverted turbulator. Typical turbulators will extend from the cooling surface 124, however it should be understood that inverted turbulators 150 are recessed in the cooling surface.

It should be appreciated that pairs of concavities 138 and film hole inlets 132 can be paired to define pairs. The pairs can be utilized to provide a steady flow to the inlets 132 as well as develop a preferable flow along the cooling surface 124 of the engine component. Furthermore, the pairs can be organized into a predetermined pattern. As shown best in FIG. 5A, the predetermined pattern can comprise a row. Alternatively, such as in FIG. 5B, the predetermined pattern can comprise offset rows. It should be appreciated that the exemplary illustrations are non-limiting, and additional patterns such as angled, serpentine, step-wise, or otherwise are contemplated.

Figure 6:
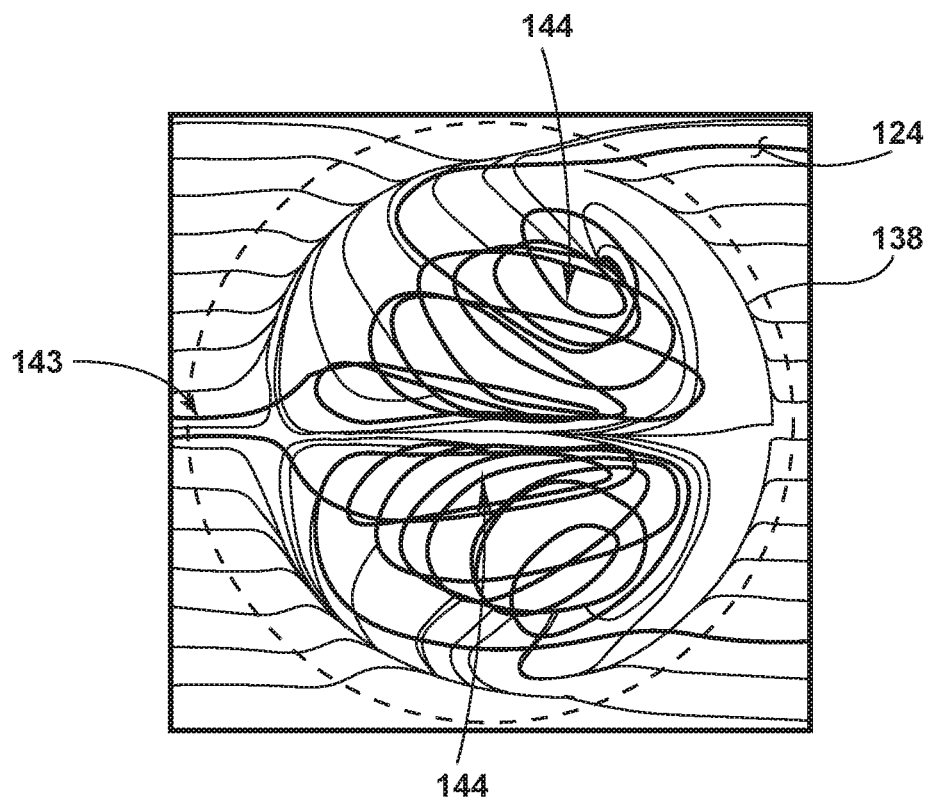
FIG. 6 is a top view of a single concavity illustrating an unsteady airflow within the concavity of FIG. 4.

Looking at FIG. 6, a streamline airflow 143 entering the concavity 138 along the center of the concavity 138 develops a vortical, unsteady flow 144 within the concavity 138. The unsteady flow 144 can prevent downstream concavities 138 from being fed with a steady streamline airflow 143, providing an inconsistent flow of cooling fluid C to the inlets 132, which decreases film cooling effectiveness provided by the film holes 130. Thus, it can be appreciated that placing the film hole inlet 132 upstream of the concavity 138 enables the inlet 132 to be fed with the consistent streamline airflow 143, steadily feeding the film hole 130 with a cooling fluid flow C to provide a develop a consistent cooling film on the hot surface 126. Utilizing the consistent streamline airflow 143, film cooling efficiency can be increased when utilizing film holes 130 in combination with internal concavities 138.

Figure 7:
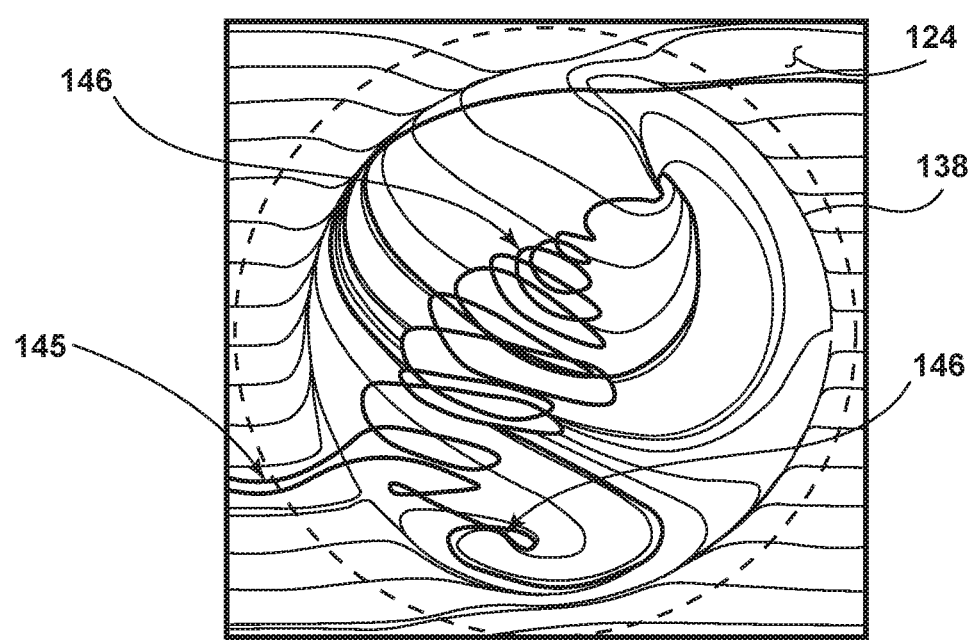
FIG. 7 is a top view of a single concavity illustrating an offset unsteady airflow within the concavity of FIG. 4.

Looking briefly at FIG. 7, a streamline flow 145 can be offset from the center of the concavity 138, generating an angled and unsteady, vortical flow 146 along the concavity 138. The angled unsteady flow 146 can generate an unsteady or chaotic flow downstream of the concavity 138, such that placing the film hole inlet 132 upstream of the concavity 138 can consistently feed the inlet 132 with a flow of cooling fluid C providing for consistent film cooling on the hot surface 126.

Figure 8:
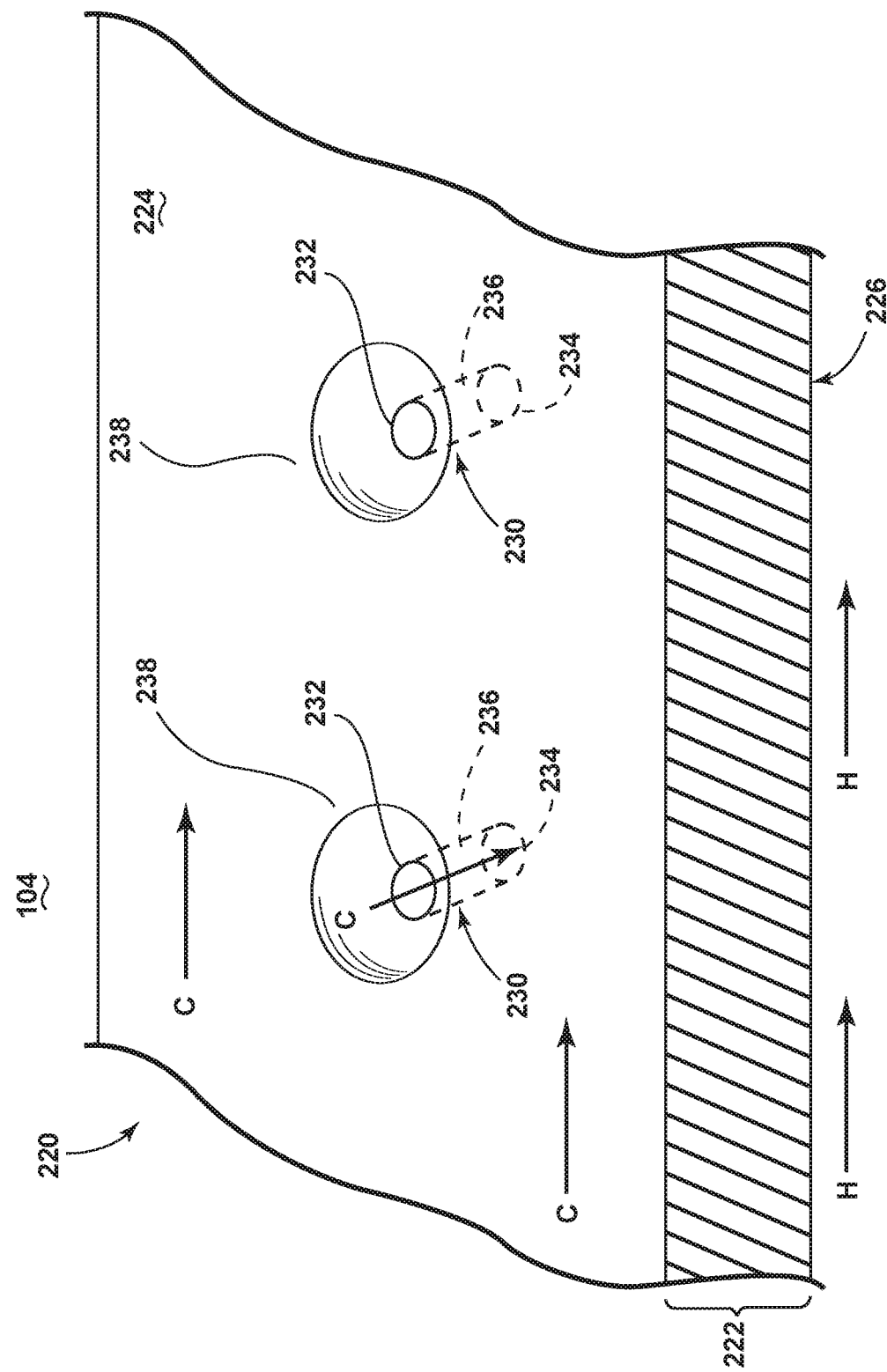
FIG. 8 is a perspective view of a portion of the engine component of FIG. 3 having a plurality of concavities with the film holes disposed therein.
Figure 9:
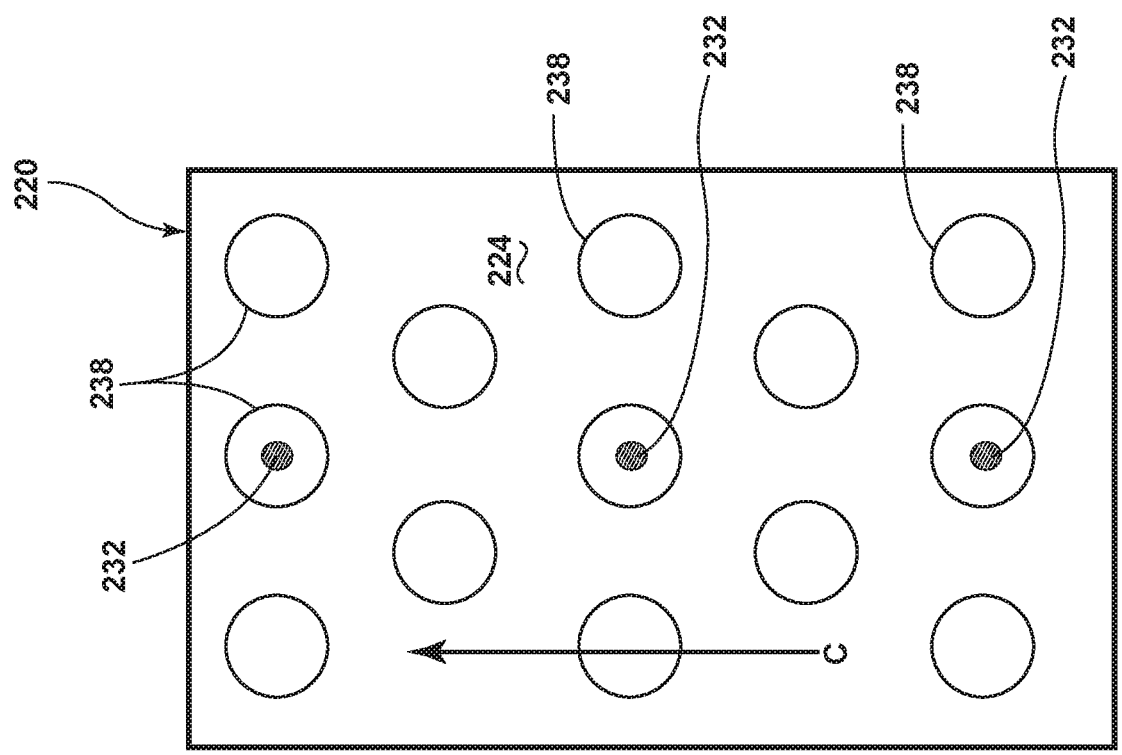
FIG. 9 is a top view of the engine component having the film holes aligned with and disposed in the concavities.

Turning to FIG. 8, the film hole inlets are disposed within the concavities 238. FIG. 8 can be substantially similar to FIG. 4 and similar numerals will be used to identify similar elements increased by a value of 100. In FIG. 8, the inlets 232 for the film holes 230 are disposed within the concavities 238, such that the cooling fluid flow C being fed to the hot surface 226 passes through the concavities 238. Looking now at FIG. 9, a top view illustrates the disposition of the inlets 232 within the concavities 238, such that the inlets 232 can be aligned with the flow of cooling fluid C moving along the engine component 220.

It should be appreciated that while the inlets 232 are illustrated as being disposed centrally within the concavities 238, the film holes can be disposed anywhere within the concavities 238, such as near the upstream or downstream edge in non-limiting examples. The placement of the film hole inlets 232 within the concavities 238 can reduce the resultant unsteady flow caused by the concavities 238, developing a steadier flow along the concavities 238 due to feeding a portion of the unsteady flow into the inlets 232.

Placing the inlets within the concavities 238 can reduce the unsteady or chaotic cooling fluid flows C, best illustrated in FIGS. 6 and 7, by drawing at least a portion of the cooling fluid flow C from the concavity, providing for a steadier flow downstream of the concavities 238. The steadier flow downstream of the concavities 238 can be utilized by additional film holes 230 or cooling structures consistently, without having to account for the chaotic or vortical flows resultant from the concavities 238.

It should be appreciated that the disposition of film hole inlets along the cooling surface of an engine component provides for creating a more deterministic flow entering the inlets and can further complement the heat transfer augmentations provided by the concavities. The thicker wall sections between the concavities can define the more deterministic flow for the film holes increasing film cooling efficiency.

It should be understood that the concavities typically generate vortical flows, providing thermal enhancement. However, the flows generated by the concavities can disrupt the steady film hole inlet flows, which can be detrimental to film cooling efficiency. By placing the film holes upstream of the concavities, the disrupted flow from the concavities will not affect the film hole inlet flow. Furthermore, placing the film holes on the surface of the engine component permits better film hole length-to-diameter ratios as compared to the thinner wall widths of the concavities. Furthermore, placement of the inlets in the surface around the concavities provides for inlet shaping for the film hole which can further increase film hole efficiency.

Additionally, by placing the film hole inlets in the concavities, the unsteady flow defined by the concavities can be minimized or at least partially steadied by the film hole inlet steadily drawing at least a portion of the cooling fluid flow passing within or along the concavities.

This written description uses examples to disclose the invention, including the best mode, and to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An engine component for a turbine engine, the turbine engine generating a hot combustion gas flow and providing a cooling fluid flow, the engine component comprising:
    a wall separating the hot combustion gas flow from the cooling fluid flow and having a hot surface along with the hot combustion gas flow and a cooling surface facing the cooling fluid flow;
    at least one concavity provided flush with and in the cooling surface having a centerline aligned with the cooling fluid flow;
    at least one film hole having an inlet provided on the cooling surface with an axis defined through the center of the inlet, an outlet provided on the hot surface, and a passage connecting the inlet and the outlet; and
    wherein the inlet is spaced from the at least one concavity, located upstream of the at least one concavity, and the axis defined through the center of the inlet is disposed parallel to the cooling fluid flow and is in cooling fluid flow alignment with the centerline of the at least one concavity.

2. The engine component of claim 1 wherein the inlet is immediately upstream of the at least one concavity.

3. The engine component of claim 1 wherein no other flow control structure is located between the inlet of the at least one film hole and the at least one concavity.

4. The engine component of claim 1 wherein the inlet is located relative to the at least one concavity such that the cooling fluid flow fed to the inlet is not disrupted by an unsteady flow at the at least one concavity.

5. The engine component of claim 1 wherein the engine component comprises any one of a vane, a blade, a shroud, a combustor deflector, and a combustor liner.

6. The engine component of claim 1 wherein the at least one concavity includes a plurality of concavities and the at least one film hole includes a plurality of film holes; and
    wherein at least a subset of the plurality of concavities and the plurality of film holes are arranged in a predetermined pattern where the predetermined pattern is a row, and with the plurality of concavities and the plurality of film holes forming pairs and arranged in the row.

7. An engine component for a turbine engine, the turbine engine generating a hot combustion gas flow and provides a cooling fluid flow, the engine component comprising:
    a wall separating the hot combustion gas flow from the cooling fluid flow and having a hot surface along with the hot combustion gas flow in a hot flow path and a cooling surface facing the cooling fluid flow;
    multiple concavities provided flush with and in the cooling surface each having a centerline arranged along the cooling fluid flow;
    multiple film holes each having an inlet provided on the cooling surface, an outlet provided on the hot surface, and a passage connecting the inlet and the outlet; and
    wherein at least a subset of the multiple concavities and a subset of inlets of the multiple film holes are paired, with one concavity of the subset of the multiple concavities being paired with one inlet of the subset of inlets, and the inlet for each pair is spaced from, located upstream of, and in cooling fluid flow alignment with the centerline of the concavity of the subset of multiple concavities forming the pair with the respective inlet.

8. The engine component of claim 7 wherein the paired concavities and inlets are arranged in a predetermined pattern.

9. The engine component of claim 8 wherein the predetermined pattern is a row.

10. The engine component of claim 9 wherein the multiple concavities are arranged in rows, with at least one of the rows including the paired concavities and inlets.

11. The engine component of claim 7 wherein each inlet of the subset of inlets of the multiple film holes are immediately upstream of each respective concavity which forms the paired concavity with each inlet.

12. The engine component of claim 7 wherein no other flow control structure is located between each paired inlet and concavity.

13. The engine component of claim 7 wherein each inlet, forming each pair with the related concavity of the multiple concavities, is located relative to the related concavity forming the pair with the respective inlet, so the cooling fluid flow fed to the inlet is not disrupted by an unsteady flow at the paired concavity.

14. An engine component for a turbine engine, the turbine engine generating a hot combustion gas flow and providing a cooling fluid flow, the engine component comprising:
    a wall separating the hot combustion gas flow from the cooling fluid flow and having a hot surface along with the hot combustion gas flow and a cooling surface facing the cooling fluid flow;
    a concavity provided flush with and in the cooling surface and extending into the wall, the concavity having a longitudinal centerline aligned with the cooling fluid flow;
    a film hole having an inlet provided on the cooling surface with an axis defined through the center of the inlet, an outlet provided on the hot surface, and a passage connecting the inlet and the outlet; and
    wherein the inlet is spaced from the concavity, located upstream of the concavity, and the axis defined through the center of the inlet is disposed parallel to the cooling fluid flow and is in cooling fluid flow alignment with the centerline of the concavity.

* * * * *